United States Patent
Kaikenger et al.

(10) Patent No.: US 11,446,193 B2
(45) Date of Patent: Sep. 20, 2022

(54) PERSON LIFT SYSTEMS

(71) Applicant: Liko Research & Development AB, Luleå (SE)

(72) Inventors: Philippe Kaikenger, Pluvigner (FR); Jean-Bernard Duvert, Auray (FR); Clémentine Pirio, Nantes (FR); Melissa R. Stancato, Syracuse, NY (US)

(73) Assignee: LIKO RESEARCH & DEVELOPMENT AB, Luleå (SE)

( * ) Notice: Subject to any disclaimer, the term of this patent is extended or adjusted under 35 U.S.C. 154(b) by 350 days.

(21) Appl. No.: 16/811,318

(22) Filed: Mar. 6, 2020

(65) Prior Publication Data
US 2020/0289352 A1 Sep. 17, 2020

Related U.S. Application Data

(60) Provisional application No. 62/819,034, filed on Mar. 15, 2019.

(51) Int. Cl.
*A61G 7/10* (2006.01)
*B66C 1/40* (2006.01)
(Continued)

(52) U.S. Cl.
CPC ........... *A61G 7/1051* (2013.01); *A61G 7/108* (2013.01); *A61G 7/1065* (2013.01); *B66C 1/40* (2013.01);
(Continued)

(58) Field of Classification Search
CPC .... A61G 7/1051; A61G 7/1065; A61G 7/108; A61G 2203/36; A61G 2205/60;
(Continued)

(56) References Cited

U.S. PATENT DOCUMENTS 7,802,328 B2 * 9/2010 Lingegard ............ A61G 7/1078
5/89.1
9,463,128 B2 * 10/2016 Ng ........................ A61G 7/1015
(Continued)

FOREIGN PATENT DOCUMENTS

CA 2656877 C * 12/2012 .......... A61G 7/1019
EP EP-2727571 A2 * 5/2014 .......... A61G 7/1015
(Continued)

*Primary Examiner* — Robert G Santos
(74) *Attorney, Agent, or Firm* — Dinsmore & Shohl LLP

(57) ABSTRACT

A person lift system includes a lift unit, a sling bar that is coupled to the lift unit, where the sling bar includes a plurality of attachment points each having coupling sensors and an electronic control unit that is communicatively coupled to the coupling sensors. The person lift system also includes a lifting accessory having a plurality of lifting points that are adapted to be selectively coupled to the plurality of attachment points of the sling bar. The electronic control unit comprises a processor and a computer readable and executable instruction set which, when executed by the processor detects with the coupling sensors whether the lifting accessory is installed in a proper manner and projects an indication when the lifting accessory is installed in the proper manner.

19 Claims, 10 Drawing Sheets

(51) Int. Cl.
*G01G 19/18* (2006.01)
*G08B 5/22* (2006.01)
*G08B 21/04* (2006.01)
*H02J 50/10* (2016.01)
*H02J 7/02* (2016.01)

(52) U.S. Cl.
CPC ............... *G01G 19/18* (2013.01); *G08B 5/22* (2013.01); *G08B 21/0446* (2013.01); *H02J 7/02* (2013.01); *H02J 50/10* (2016.02); *A61G 7/1046* (2013.01); *A61G 2203/12* (2013.01); *A61G 2203/20* (2013.01); *A61G 2203/36* (2013.01); *A61G 2205/60* (2013.01)

(58) Field of Classification Search
CPC . B66C 1/40; G01G 19/18; G08B 5/22; G08B 21/0446; H02J 50/10; H02J 7/02
USPC ........... 5/85.1, 87.1, 86.1, 89.1, 83.1, 81.1 R
See application file for complete search history.

(56) References Cited

U.S. PATENT DOCUMENTS

| | | | | |
|---|---|---|---|---|
| 10,376,434 | B2 * | 8/2019 | Andersson | A61G 7/1065 |
| 10,478,361 | B2 * | 11/2019 | Harmeyer | A61G 7/1017 |
| 11,259,976 | B2 * | 3/2022 | Newman | A61G 7/10 |
| 2009/0307840 | A1 * | 12/2009 | Lingegard | A61G 7/1076 5/83.1 |
| 2010/0097181 | A1 | 4/2010 | Sorensen et al. | |
| 2014/0020175 | A1 | 1/2014 | Dixon et al. | |
| 2014/0115778 | A1 | 5/2014 | Ng | |
| 2016/0296399 | A1 * | 10/2016 | Ng | G08B 5/00 |
| 2017/0000672 | A1 | 1/2017 | Andersson et al. | |
| 2017/0000673 | A1 * | 1/2017 | Harmeyer | A61G 7/1065 |
| 2017/0027794 | A1 | 2/2017 | Andersson et al. | |
| 2020/0170864 | A1 * | 6/2020 | Newman | A61G 7/1038 |
| 2020/0289352 | A1 * | 9/2020 | Kaikenger | G01G 19/18 |
| 2022/0015972 | A1 * | 1/2022 | Conejo Castano | A61G 7/1051 |
| 2022/0133570 | A1 * | 5/2022 | Newman | A61G 7/1061 5/85.1 |

FOREIGN PATENT DOCUMENTS

| | | | | |
|---|---|---|---|---|
| EP | 2952169 | A1 * | 12/2015 | ........... A61G 7/1015 |
| EP | 2037857 | B1 * | 5/2016 | ........... A61G 7/1019 |
| EP | 3111906 | A1 * | 1/2017 | ............... A61G 7/10 |
| EP | 3659568 | A1 * | 6/2020 | ............... A61G 7/10 |
| WO | WO-2008007222 | A2 * | 1/2008 | ........... A61G 7/1019 |
| WO | 2015105509 | A1 | 7/2015 | |

* cited by examiner

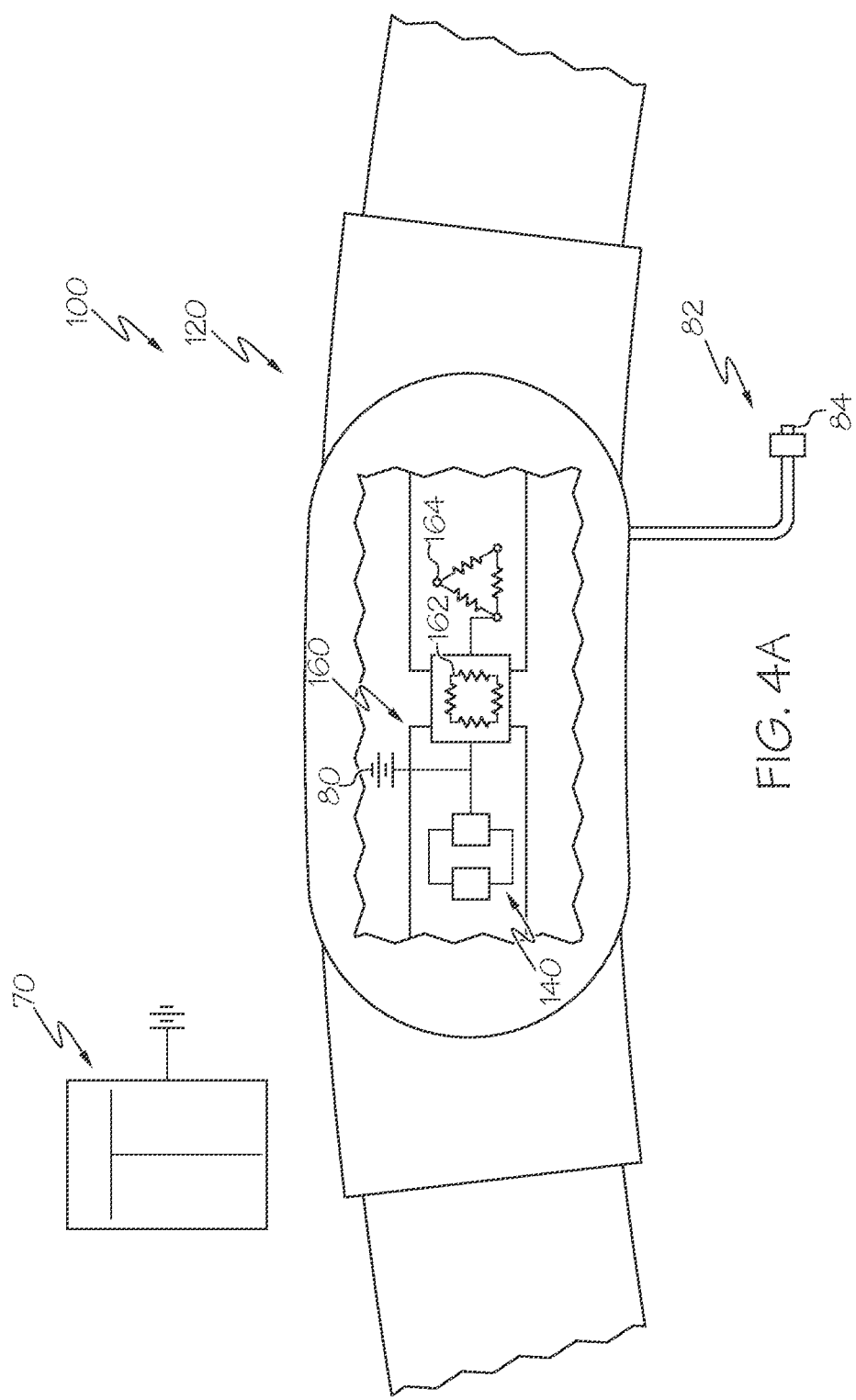

# PERSON LIFT SYSTEMS

CROSS-REFERENCE TO RELATED APPLICATIONS

This application claims the benefit of and priority to U.S. Provisional Application Ser. No. 62/819,034, titled "Person Lift Systems," filed Mar. 15, 2019, the entire contents of which is hereby incorporated by reference herein.

TECHNICAL FIELD

The present specification generally relates to person lift systems and, more particularly, to person lift systems having sling bars with electronic control units and methods for operating the same.

BACKGROUND

Lift systems, such as person lift systems that include lift units such as mobile lifts and/or overhead lifts, may be used in hospitals and other health care facilities to move a person from one location to another or to assist the person in moving from one posture to another. Conventional lift systems utilize a sling or other lifting accessory to secure a person to the lift system and an actuator to lift the person to a different elevation or lower the person to a lower elevation. In one typical example, a caregiver operates the lift unit to raise the person off a person support surface (e.g., a bed), repositions the person by moving the lift system to a desired location, and then operates the lift unit again to lower the person to the destination.

The various accessories for attachment to the lift system may be designed to be used in a specific orientation to facilitate proper lifting. A need exists for alternative methods for ensuring proper operation of the lift system when moving a person.

SUMMARY

According to a first aspect, a person lift system comprises a lift unit, a sling bar that is coupled to the lift unit, the sling bar comprising a plurality of attachment points each having coupling sensors and an electronic control unit that is communicatively coupled to the coupling sensors, and a lifting accessory comprising a plurality of lifting points that are adapted to be selectively coupled to the plurality of attachment points of the sling bar. The electronic control unit comprises a processor and a computer readable and executable instruction set which, when executed by the processor: detects with the coupling sensors whether the lifting accessory is installed in a proper manner and projects an indication when the lifting accessory is installed in the proper manner.

According to a second aspect, the person lift system includes the person lift system of the first aspect, wherein the lifting accessory comprises a plurality of identification emitters that are positioned proximate to each lifting point.

According to a third aspect, the person lift system includes the person lift system of the second aspect, wherein the coupling sensors of the sling bar comprise emitter detectors that detect whether the identification emitters of the lifting accessory are properly positioned relative to the attachment points of the sling bar.

According to a fourth aspect, the person lift system includes the person lift system of the third aspect, wherein the electronic control unit of the sling bar is communicatively coupled to the lift unit, and the computer readable instruction set, when executed by the processor: permits operation of the lift unit when no identification emitter is detected by any coupling sensor; interrupts operation of the lift unit when less than all of the identification emitters is detected by the coupling sensors or if any one of the identification emitters is positioned incorrectly relative to the coupling sensors; and allows operation of the lift unit when all of the identification emitters of the lifting accessory are positioned correctly relative to the coupling sensors.

According to a fifth aspect, the person lift system includes the person lift system of any previous aspect, wherein at least one attachment point of the sling bar comprises a latching hook and a switch arranged on the attachment point detects a closed state of the latching hook.

According to a sixth aspect, the person lift system includes the person lift system of the fifth aspect, wherein the computer readable and executable instruction set, when executed by the processor: operates the electronic control unit in a low power consumption mode when the switch arranged on the attachment point changes from a closed or open state and no lifting accessory is detected by the coupling sensors; and operates the electronic control unit in a full function mode when the switch arranged on the attachment point changes from a closed or open state and the lifting accessory is detected by the coupling sensors.

According to a seventh aspect, the person lift system includes the person lift system of any of the third through sixth aspects, wherein the identification emitters comprise RFID tags and the emitter detectors comprise RFID readers.

According to an eighth aspect, the person lift system includes the person lift system of any previous aspect, wherein the sling bar further comprises a power source in electronic communication with the electronic control unit.

According to a ninth aspect, the person lift system includes the person lift system of the eighth aspect, wherein the power source comprises a battery.

According to a tenth aspect, the person lift system includes the person lift system of the eighth aspect, further comprising a charging interface in electronic communication with the power source.

According to an eleventh aspect, the person lift system includes the person lift system of the tenth aspect, wherein the charging interface comprises a plurality of terminals that are positioned along an outside surface of the sling bar.

According to a twelfth aspect, the person lift system includes the person lift system of the eighth aspect, wherein the charging interface comprises an inductive charging coil.

According to a thirteenth aspect, the person lift system includes the person lift system of the twelfth aspect, wherein the lift unit further comprises an inductive charging base coil that is inductively coupled to the charging coil.

According to a fourteenth aspect, the person lift system includes the person lift system of the eighth aspect, wherein the power source comprises a piezoelectric generator.

According to a fifteenth aspect, the person lift system includes the person lift system of any previous aspect, wherein the sling bar further comprises an accelerometer that is communicatively coupled to the electronic control unit.

According to a sixteenth aspect, the person lift system includes the person lift system of the thirteenth aspect, wherein the computer readable and executable instruction set, when executed by the processor: operates the electronic control unit in a low power consumption mode when the accelerometer detects no movement of the sling bar; and operates the electronic control unit in a full function mode when the accelerometer detects movement of the sling bar.

According to a seventeenth aspect, the person lift system includes the person lift system of any previous aspect, wherein the sling bar further comprises a wireless data module that is in communication with the electronic control unit.

According to an eighteenth aspect, the person lift system includes the person lift system of any previous aspect, wherein the sling bar further comprises an identification emitter.

According to a nineteenth aspect, the person lift system includes the person lift system of the eighteenth aspect, wherein the lift unit comprises an identification emitter and the sling bar comprises an identification detector that detects the identification emitter of the lift unit.

According to a twentieth aspect, the person lift system includes the person lift system of any previous aspect, wherein the sling bar further comprises a scale that is in electronic communication with the electronic control unit and that is positioned to detect weight that is applied to all of the attachment points of the sling bar through the lifting accessory.

According to a twenty-first aspect, the person lift system includes the person lift system of the twentieth aspect, wherein the computer readable instruction set, when executed by the processor: calculates a weight applied to the sling bar through the lifting accessory; and determines if the weight applied to the sling bar is within predetermined loading limits of the lift unit, the sling bar, and the lifting accessory.

According to a twenty-second aspect, a person lift system comprises a lift unit and a sling bar that is coupled to the lift unit, the sling bar comprising an activation sensor and an electronic control unit that is communicatively coupled to the activation sensor. The electronic control unit comprises a processor and a computer readable and executable instruction set which, when executed by the processor: operates the electronic control unit in a low power consumption mode when the activation sensor is not triggered; and operates the electronic control unit in a full function mode when the activation sensor is triggered.

According to a twenty-third aspect, the person lift system comprises the person lift system of the twenty-second aspect, wherein the activation sensor comprises a coupling sensor and a switch, the activation sensor activating by changing the state of the switch from closed or open, activating the coupling sensor, and the coupling sensor detecting an identification emitter.

According to a twenty-fourth aspect, the person lift system comprises the person lift system of the twenty-second aspect, wherein the activation sensor is an accelerometer that is triggered by movement of the sling bar.

According to a twenty-fifth aspect, the person lift system comprises the person lift system of any of the twenty-second through twenty-fourth aspects, wherein the sling bar further comprises a power source in electronic communication with the electronic control unit.

According to a twenty-sixth aspect, the person lift system comprises the person lift system of the twenty-fifth aspect, wherein the power source comprises a battery.

According to a twenty-seventh aspect, the person lift system comprises the person lift system of the twenty-fifth or twenty-sixth aspects, further comprising a charging interface in electronic communication with the power source.

According to a twenty-eighth aspect, the person lift system comprises the person lift system of the twenty-seventh aspect, wherein the charging interface comprises a plurality of terminals that are positioned along an outside surface of the sling bar.

According to a twenty-ninth aspect, the person lift system comprises the person lift system of the twenty-fifth aspect, wherein the charging interface comprises an inductive charging coil.

According to a thirtieth aspect, the person lift system comprises the person lift system of the twenty-ninth aspect, wherein the lift unit further comprises an inductive charging base coil that is inductively coupled to the charging coil.

According to a thirty-first aspect, the person lift system comprises the person lift system of the twenty-fifth aspect, wherein the power source comprises a piezoelectric generator.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 4A is a schematic view of a sling bar and a local area network according to one or more embodiments shown or described herein;

DETAILED DESCRIPTION

Figure 1:
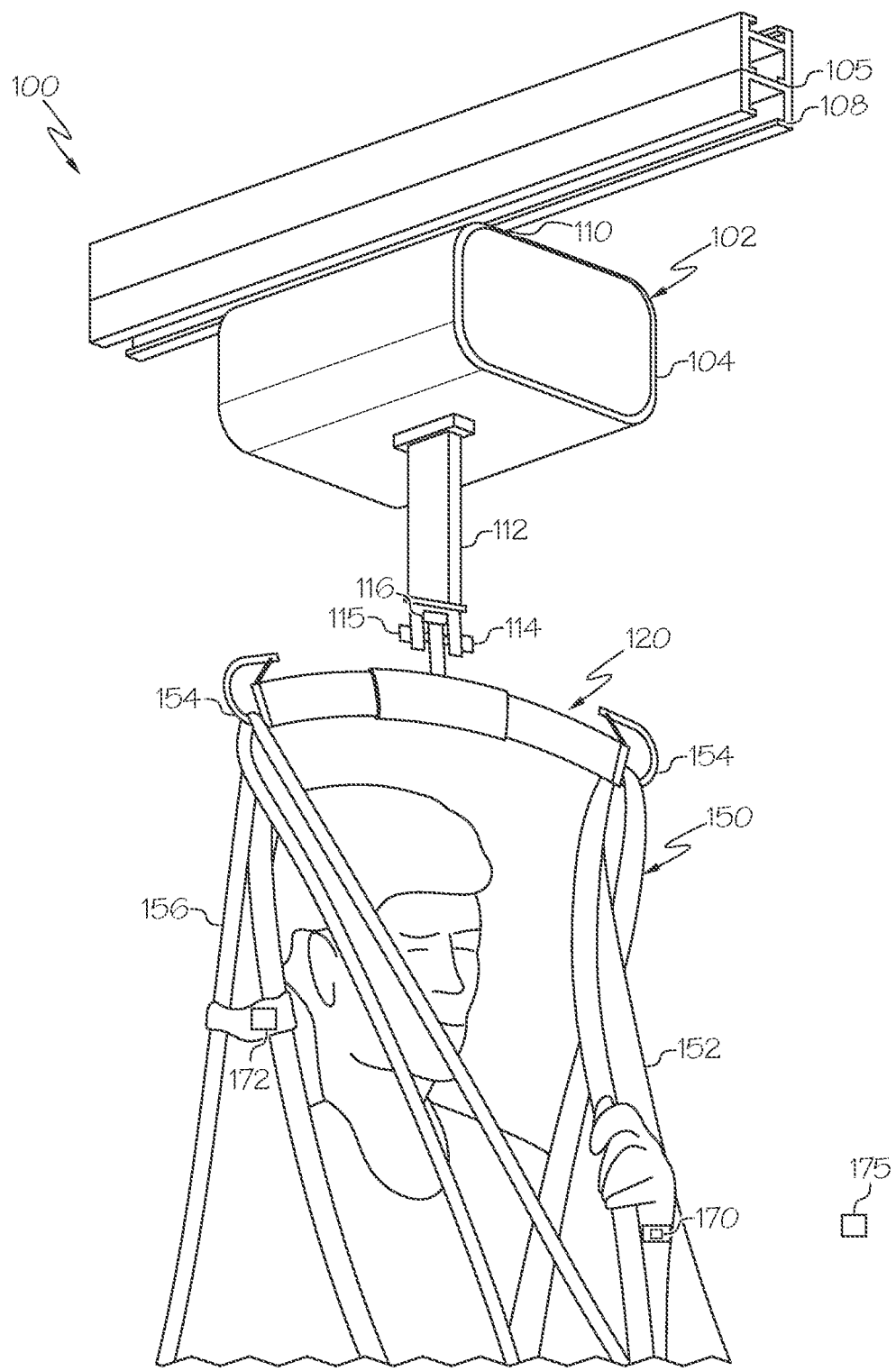
FIG. 1 is a partial side perspective view of a person seated in a lifting accessory and suspended from an embodiment of a lift system according to one or more embodiments shown or described herein.

Reference will now be made in detail to embodiments of person lift systems and methods of operating the same, examples of which are illustrated in the accompanying drawings. Whenever possible, the same reference numerals will be used throughout the drawings to refer to the same or like parts.

Embodiments of the person lift system include a lift bar, sometimes referred to herein as a sling bar, having a plurality of attachment points that each have a coupling sensor that detect positioning of a lifting accessory on the lift bar. The coupling sensors communicate with an electronic control unit, which determines if the lifting accessory is properly positioned on the lift bar. The electronic control unit may communicate a status of the lifting accessory to a caregiver and/or may allow or interrupt operation of the person lift system based on the determined status of the lifting accessory.

Person lift systems are typically deployed into patient care environments, such as hospitals and rehabilitation facilities, and allow caregivers to reposition individuals or to change a person's posture while minimizing exertion of the caregiver. However, the components of the person lift system may not be suitable for use with all individuals. For example, some components are intended for pediatric patients while other components are intended for bariatric patients. Further, the components of the person lift system may be regularly removed, positioned to support a person, and reinstalled in the person lift system. If the components are not installed correctly, the person lift system may not operate as intended when a caregiver attempts to move the person.

In various embodiments described herein, the person lift system includes components that determine if the person lift system is being used appropriately, and provide a corrective action if it is determined that the person lift system is not being used appropriately. In some embodiments, the person lift system may provide a caregiver with an indication that the person lift system is not being used appropriately. In some embodiments, the person lift system may function in a reduced functionality mode and/or may interrupt operation of the person lift system by, for example, preventing the person lift system from lifting a person. Enacting such corrective actions allows a caregiver to correct the person lift system without the person lift system being used inappropriately.

Additionally, embodiments of the person lift system described herein include a sling bar having various sensors and electrical components arranged therein. In some embodiments, the electrical components can include a scale to measure weight of the person, along with network connectivity components and a power supply, such as a battery. In order to manage power consumption, various methods and activation sensors can be used to determine if certain coupling sensors need to be activated due to the sling bar being in use, or if the sling bar can stay in a low power consumption mode.

Various embodiments of person lift systems and methods for operating the same will be described herein with specific reference to the appended drawings.

Referring now to FIG. 1, one embodiment of a person lift system 100 is depicted. In the depicted embodiment, the person lift system 100 includes a lift unit 102, a sling bar 120 that is coupled to the lift unit 102, and a lifting accessory 150 that is selectively coupled to the sling bar 120.

In the depicted embodiment, the lift unit 102 includes an overhead lift apparatus 104 that is affixed to a ceiling of a room or other overhead structure. In FIG. 1, the ceiling of the room includes a beam 105 to which the overhead lift apparatus 104 is affixed. The beam 105 may include an extrusion having a channel 108 within which is provided a sliding element 110 that is movable along the channel 108 and that extends out of the channel to support the lift apparatus. The beam 105 is affixed to and supported by structural elements of the building or other structure in which the beam is located. The beam 105 may form part of the building or may be added or affixed to components of the building. Other elements for supporting the lift apparatus from the ceiling may be provided and are within the scope of this disclosure.

A lift strap 112 is connected at a first end to the overhead lift apparatus 104 and configured to be taken up or paid out from the overhead lift apparatus 104. A quick-release link 114, also referred to as a "Q-link" or connector link, is coupled to a free second end of the lift strap 112, and the sling bar 120 is coupled to the quick-release link 114 by a fastener 115. A sensor 116 is arranged on the quick-release link 114 and communicatively connects with an electronic control unit 140 (shown in FIG. 3). In one embodiment, the sensor 116 is a hook switch that can determine if the quick-release link 114 and the fastener 115 are oriented properly and fully secured to one another. If the sensor 116 is not fully activated, an indicator may alert a caregiver to the improper orientation of the sling bar 120 and the lift strap 112, as will be described in greater detail below.

The lift unit 102 may receive an input from a caregiver via a control device (not shown) coupled to the lift unit 102. The control device may include a wired controller and/or one or more wireless controllers. For example, in one embodiment, the control device may be a wired controller (such as a pendant or the like) or, alternatively, a controller integrated into the lift unit 102. In some embodiments, the controller may be in electronic communication with an electronic control unit of the sling bar 120, which is described in greater detail below. The electronic control unit may pass the control signal from the control device to the lift unit 102. In another embodiment, the controller may be a wireless controller such as a wireless hand control and/or a wireless diagnostic monitor/control. Based on the input received from the control device, the lift unit 102 may selectively pay out or take up lift strap 112.

In FIG. 1, the lifting accessory 150 is coupled to the sling bar 120 to support a person. In various embodiments, the lifting accessory 150 may include a lifting sling, a lifting vest, a lifting strap, a lifting sheet, or the like. The weight of the person is born by the sling bar 120 as a result of the lifting accessory 150 being suspended below the sling bar 120. Other devices for supporting a person or other load are possible and within the scope of the present disclosure.

Figure 2:
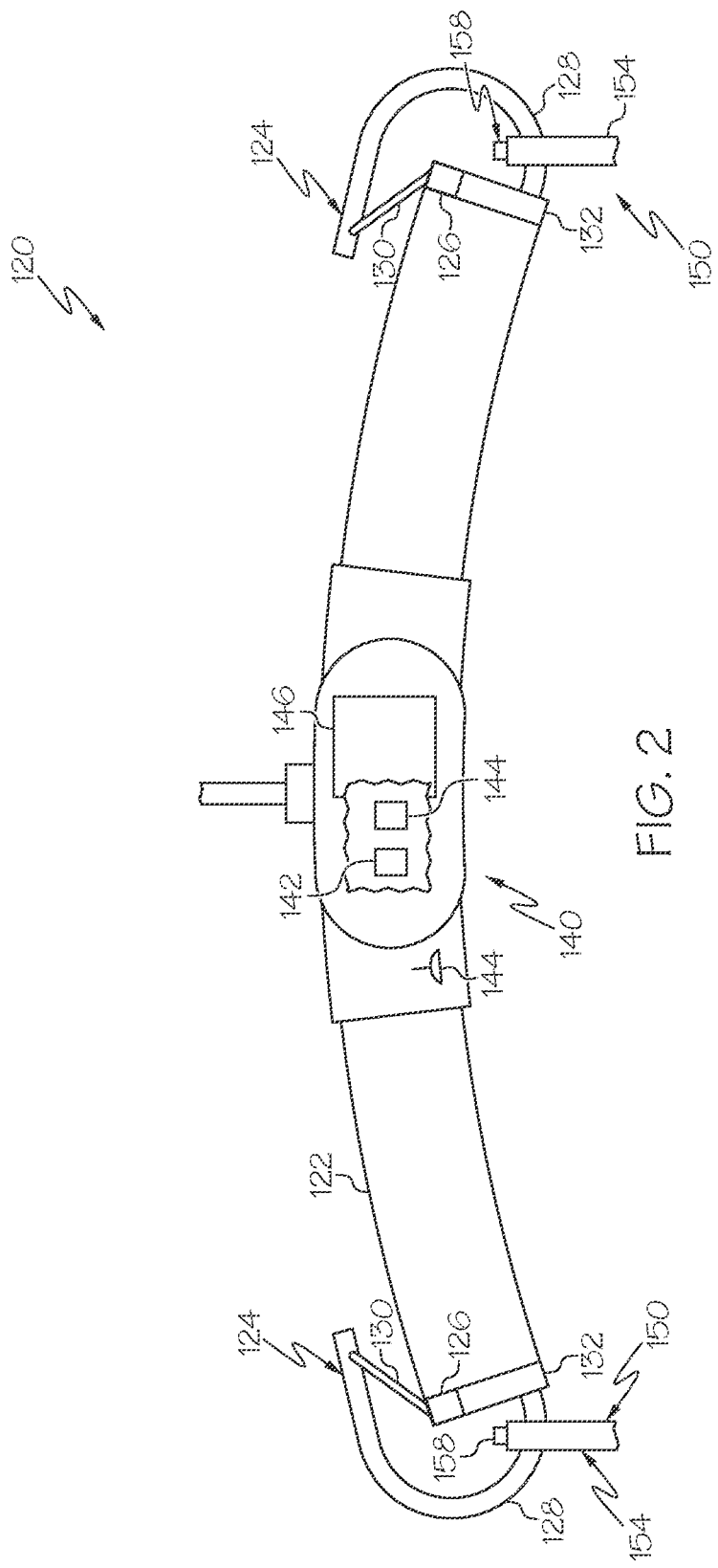
FIG. 2 is a front view of a sling bar according to one or more embodiments shown or described herein.

Referring now to FIG. 2, the sling bar 120 may include a frame 122 to which the plurality of attachment points 124 are coupled and positioned at various locations along the sling bar 120. The attachment points 124 may each include a shackle 128 into which lifting points 154 of the lifting accessory 150 are inserted or removed. The attachment points 124 may also include a latching hook 130 that selectively opens and closes to prevent an inserted lifting point 154 from being removed from the shackle 128. As discussed hereinabove, the attachment points 124 include a coupling sensor 132. The coupling sensor 132 is positioned to detect the presence or absence of a lifting accessory 150 in the shackle 128 of the respective attachment point 124, as will be discussed below in greater detail. Additionally, the attachment points 124 include a switch 126. The switch 126 is positioned to detect an open or a closed state of the latching hook 130 of the attachment point 124.

The sling bar 120 further includes an electronic control unit 140 that is communicatively coupled to the plurality of coupling sensors 132 and the switches 126 of the sling bar 120. In the embodiment depicted in FIG. 2, the electronic control unit 140 is positioned within the sling bar 120. The electronic control unit 140 includes a processor 142 and a memory 144 that stores a computer readable instruction set. In various embodiments referred to herein, when "the electronic control unit 140" is said to perform a particular function, it should be understood that the computer readable instruction set stored in the memory 144 of the electronic control unit 140 is executed by the processor 142 of the electronic control unit 140 to cause the function to be performed.

The electronic control unit 140 is communicatively coupled to the coupling sensors 132 and the switches 126 of the attachment points 124 of the sling bar 120. In some embodiments, the electronic control unit 140 may be communicatively coupled to a display 146 that is positioned on an exterior surface 125 of the sling bar 120 such that the display 146 is viewable by a caregiver. In some embodiments, the electronic control unit 140 may be communicatively coupled to an audible indicator 147. In some embodiments, the electronic control unit 140 may be communicatively coupled to the lift unit 102 to which the sling bar 120 is coupled.

As will be described in greater detail below, in some embodiments, the electronic control unit 140 determines whether the lifting accessory 150 has been properly installed relative to the attachment points 124 of the sling bar 120. In other embodiments, the electronic control unit 140 may recognize suitability of the components of the person lift system 100 for the person. In lift situations in which the person lift system 100 is being operated correctly, the electronic control unit 140 may command the display 146 and/or the audible indicator 147 to provide an indication to the caregiver that of acceptability of the lift situation.

In lift situations in which a component of the person lift system 100 is not being operated correctly, the electronic control unit 140 may take a corrective action, including providing an indication to a caregiver and/or interrupting full operability of the lift unit 102. Such corrective action may allow the caregiver to correct the deficiency of the configuration of the person lift system 100 and may ensure that the person lift system 100 is used according to its design. Once appropriate corrective action has been taken, the electronic control unit 140 may provide an indication of acceptable operation and may allow full functionality of the person lift system 100.

In various embodiments, the person lift system 100 includes a lifting accessory 150, for example a lift sling 152, as depicted in FIGS. 1 and 2. The lift sling 152 includes a plurality of strap members 156 that are configured to support a person in a particular posture. The lift sling 152 further includes a plurality of lifting points 154 that are coupled to the strap members 156. The lifting points 154 may be selectively inserted into the attachment points 124 of the sling bar 120 to selectively couple the lift sling 152 to the sling bar 120.

As will be described in greater detail below, when the lifting points 154 of the lift sling 152 are inserted into the attachment points 124 of the sling bar 120, the coupling sensors 132 of the sling bar 120 determine the presence of the lifting points 154. In some embodiments, the lifting points 154 may include a plurality of identification emitters 158 that are associated with the particular lifting point 154 and provide an indication to the coupling sensors 132 of the lifting point 154. In such embodiments, the coupling sensors 132 are capable of determining which of the identification emitters 158, and therefore which associated lifting point 154, is positioned proximate to the coupling sensor 132. Based on the order in which the identification emitters 158 are positioned proximate to the coupling sensor 132, the electronic control unit 140 can determine if the associated lifting points 154 are positioned in the correct order on the attachment points 124 of the sling bar 120. The electronic control unit 140, therefore, may determine if the lift sling 152 is positioned properly to lift a person according to the design of the person lift system 100.

In some embodiments, the identification emitters 158 are passive radio frequency identification device (RFID) tags, and the coupling sensor 132 is an RFID transmitter and receiver. Additionally, in some embodiments, the identification emitters 158 are secured within the lifting point 154 to allow self-wearing of the identification emitters 158 for a prescribed number of lifts. This self-wearing feature would prevent a lift sling 152 from being used for more than a pre-determined number of lifts a sling can or should perform. As the identification emitters 158 wear due to lifts with the lift sling 152, a break will occur in the RFID tag of the identification emitters 158, such as the antenna breaking at a designed break point.

It should be understood that the relative orientation of the lifting accessory 150 to the sling bar 120 may be varied and yet still be assembly properly relative to one another. For example, the lifting accessory 150 may be varied in its installation relative to the attachment points 124 of the sling bar 120. In such embodiments, the electronic control unit 140 may include within its computer readable instruction set logic that allows the electronic control unit 140 to evaluate whether coupling of the lifting accessories 150 onto the sling bar 120 are proper. By evaluating the order in which the identification emitters 158 are detected by the coupling sensors 132, the electronic control unit 140 can determine if the lifting accessory 150 is properly assembled irrespective of the absolute orientation of the lifting accessory 150 relative to the sling bar 120.

As will be described in greater detail below, when the electronic control unit 140 determines that the lifting accessory 150 is not attached in proper orientation on the sling bar 120, the electronic control unit 140 provides a warning signal, such as with the display 146 and/or audible indicator 147 of the sling bar 120. For example, the electronic control unit 140 may illuminate a portion of the display 146 as red to indicate that the lifting accessory 150 is not properly coupled to the sling bar 120. In some embodiments, the electronic control unit 140 may lock-out the actuation controls of the lift unit 102 when the lifting accessory 150 is not properly attached to the sling bar 120 to prevent the person lift system 100 from being used in a lift procedure until the assembly is corrected. In another embodiment, if the lifting accessory 150 is properly attached to the sling bar 120, the electronic control unit 140 provides an indication to the caregiver, such as with the display 146 and/or audible indicator 147. For example, in one embodiment, the electronic control unit 140 may illuminate a portion of the display 146 as green (or maintain the illumination as green) to indicate that the lifting accessory 150 is properly attached to the sling bar 120.

In embodiments described herein, the coupling sensor 132 may include a bar code scanner, QR code reader, RFID tag reader, machine vision system, camera, or the like. The coupling sensor 132 may be used to detect the identity of accessories coupled to the sling bar 120 and, in conjunction with the electronic control unit 140, determine the compatibility of the lifting accessory 150, as will be described in further detail herein. In one example, the coupling sensor 132 is a bar code scanner 134 that is communicatively coupled to the electronic control unit 140. In this embodiment, the bar code scanner 134 may be utilized by a caregiver to scan lifting accessories 150 and sling bars 120 attached to the person lift system 100 and store data corresponding to the identity or operating parameters of lifting accessories 150 and sling bars 120 in memory. In alternative embodiments, the coupling sensor 132 may be an RFID tag reader positioned proximate to respective attachment points 124 with an active region that envelopes the attachment point 124. The active region may be shaped through the use of appropriate antennas and readers such that only RFID tagged components attached to the respective attachment point 124 of the person lift system 100 are identified by the coupling sensor 132. The coupling sensor 132 may include, for example, CS468 RFID reader and a CS790 antenna (available from Convergence Systems Ltd. of Hong Kong), which may be used in conjunction with one another to shape the active area of the coupling sensor 132. However, it should be understood that other RFID readers and antennas suitable for shaping the active area of the coupling sensor 132 may be used.

Figure 3:
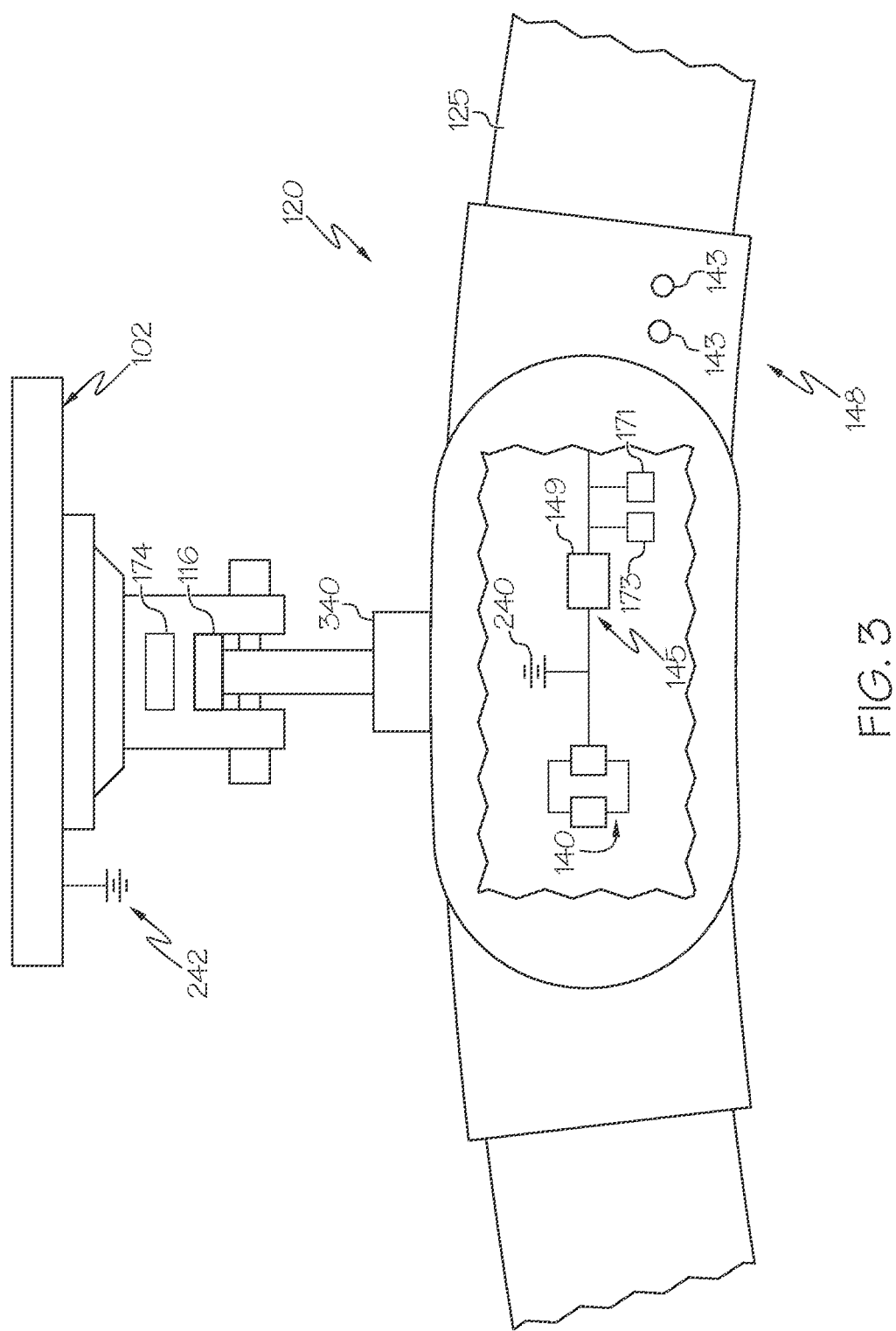
FIG. 3 is a front view of a sling bar according to one or more embodiments shown or described herein.

Referring now to FIG. 3, in some embodiments, the sling bar 120 may include a power source 145 that is in electronic communication with the electronic control unit 140. The power source 145 may include a battery 149 that is positioned within the sling bar 120. In various embodiments, the sling bar 120 may further include a charging interface 148 that is in electronic communication with the battery 149. The charging interface 148 allows the battery 149 to be charged when the charging interface 148 is positioned proximate to a charging base station. In some embodiments, the charging interface 148 may include a plurality of terminals 143 that are positioned along an exterior surface 125 of the sling bar 120. The plurality of terminals 143 may be selectively placed into electrical continuity with the charging base station. In various embodiments, the changing base station may be in electrical continuity with a main power source, which provides an electrical charge to the battery 149.

In other embodiments, the charging interface 148 includes an inductive charging coil 240 that is positioned in the sling bar 120. The inductive charging coil 240 may be positioned in proximity to a charging field, for example, an electromagnetic charging field that is produced by an inductive charging base coil 242. The inductive charging coil 240 and the inductive charging base coil 242 may be inductively coupled to one another such that energy emitted by the inductive charging base coil 242 in the charging field is captured by the inductive charging coil 240 and is directed to the battery 149 for charging. In some embodiments, the inductive charging base coil 242 is incorporated into the lift unit 102, such that the lift unit 102 provides power to charge the battery 149 of the sling bar 120. In other embodiments, the inductive charging base coil is positioned at a location in which the inductive charging base coil may be connected to a main power source.

In yet other embodiments, the charging interface 148 includes a piezoelectric generator 340 that is incorporated into the sling bar 120. The piezoelectric generator 340 incorporates a piezoelectric material that generates a voltage in response to a mechanical stress being applied to the material. In such an embodiment, the piezoelectric generator 340 is positioned proximate to a connector 136 of the sling bar 120 to which the sling bar 120 is attached to the lift unit 102. Through loading and unloading of the sling bar 120, mechanical stress will be directed into the piezoelectric generator 340, thereby generating voltage that can be captured to charge the battery 149.

In other embodiments, the sling bar 120 includes an RFID scanner 171 and an RFID scanner 173. The RFID scanner 171 can be used to detect various passive RFID tags to gather information about the lift being performed with the sling bar 120. These passive RFID tags may include, by way of example and not limitation, a person tag 170 (containing information about the person being lifted), a sling tag 172 (containing information about the sling being used, such as weight limit, number of uses, etc.), and a caregiver tag 175 (containing information about the caregiver performing the lift). The RFID scanner 173 can be used to detect a lift strap tag 174 including information about the lift being used, such as max lifting weight. Data detected and gathered by the RFID scanner 171 and the RFID scanner 173 can be transmitted back to the electronic control unit 140, which can either store the data in the memory 144, or transmit the data to an external source from the sling bar 120 via Wi-Fi, Bluetooth, a local network connection, or another wireless or wired connection.

In one embodiment, such as the embodiment depicted in FIG. 4A, the sling bar 120 may include a scale 160. The scale 160 includes a load cell 162 that is positioned within the sling bar 120. The load cell 162 may include a strain gauge or other strain sensing member. The load cell 162 measures the load applied to the attachment points 124 of the sling bar 120, for example, the load applied to the attachment points 124 by the lift sling 152, as shown in FIG. 2. The scale 160 is communicatively coupled to the electronic control unit 140. The scale 160 can communicate to the electronic control unit 140 the load measurement that captured by the load cell 162.

The sling bar 120 may further include an accelerometer 164 that determines the orientation of the sling bar 120. The accelerometer 164 may be communicatively coupled to the electronic control unit 140. The electronic control unit 140 may use the accelerometer 164 to determine a tilt angle of the sling bar 120 relative to a vertical gravitational axis. Based on the tilt angle of the sling bar 120, the electronic control unit 140 can calculate an accurate weight that the sling bar 120 is supporting. The electronic control unit 140, therefore, can compensate for variations in the orientation of the sling bar 120 and determine the weight that is lifted by the components of the person lift system.

In some embodiments, the weight that is measured by the scale 160 is directed to the display 146 (shown in FIG. 2), which allows the caregiver to view the weight of the person being lifted by the person lift system. The weight of the person may be important to monitor in a caregiving environment, and may be difficult to measure if the person is not ambulatory throughout the caregiving environment.

Referring collectively to FIGS. 1-4A, in some embodiments, the electronic control unit 140 may determine if the weight lifted by the sling bar 120 is within or outside of a predetermined loading limit of the lift unit 102, the sling bar 120, and the lifting accessory 150. In cases in which the weight lifted by the sling bar 120 is outside of the predetermined load limit of one of the lift unit 102, the sling bar 120, and/or the lifting accessory 150, the sling bar 120 may project an indication on the display 146 or project an indication through the audible indicator 147 that a component of the person lift system 100 is being operated outside of its design conditions. In some embodiments, when the weight lifted by the sling bar 120 exceeds the predetermined load limit of one of the components of the person lift system 100, the sling bar 120 may communicate with the lift unit 102 to operate the lift unit 102 in a reduced functionality mode.

Such a reduced functionality mode may allow the caregiver to take corrective action to correct the improper use condition of the person lift system 100. For example, when the predetermined load limit of one of the components of the person lift system 100 is exceeded, the lift unit 102 may operate in a reduced speed mode that reduces dynamic loading that may be applied to components of the person lift system 100. In other embodiments, when the predetermined load limit of one of the components of the person lift system 100 is exceeded, the lift unit 102 may be selected to lower the person and not raise the person, such that the person can be lowered into position on, for example, a person support apparatus, such as a bed. Once the person is lowered onto the person support apparatus, the caregiver can take corrective actions to operate the person lift system 100 according to its prescribed design.

Referring to FIG. 2, in some embodiments, the switches 126 may be used to determine if the sling bar 120 can stay in a low power consumption mode, or determine if a lift is to be performed. The sling bar 120 may default to a low power consumption mode when a lift is not being performed. The passive state of the switches 126 can be a closed state with the latching hook 130 pressing against the switch 126. When a lift is to be performed, or when a lift has been completed, the lifting points 154 are either inserted into or removed from the attachment point 124. To insert or remove lifting points from the attachment point 124, the latching hook 130 is pivoted, opening the switch 126. This opening of the switch 126 is communicated with the electronic control unit 140 and triggers the method shown in FIG. 7, which is described in greater detail hereinbelow.

At the opening of the switch 126, the coupling sensors 132 are activated for a predetermined time interval. In some embodiments, the time interval is 15 seconds. If none of the identification emitters 158 are detected by the coupling sensors 132 within the predetermined time interval, the sling bar 120 will go into a low power consumption mode because the lack of detection of the identification emitters 158 indicated that a sling has been removed since a lift has finished, or that the lift sling 152 cannot be used due to damage to the identification emitters 158.

Figure 5:
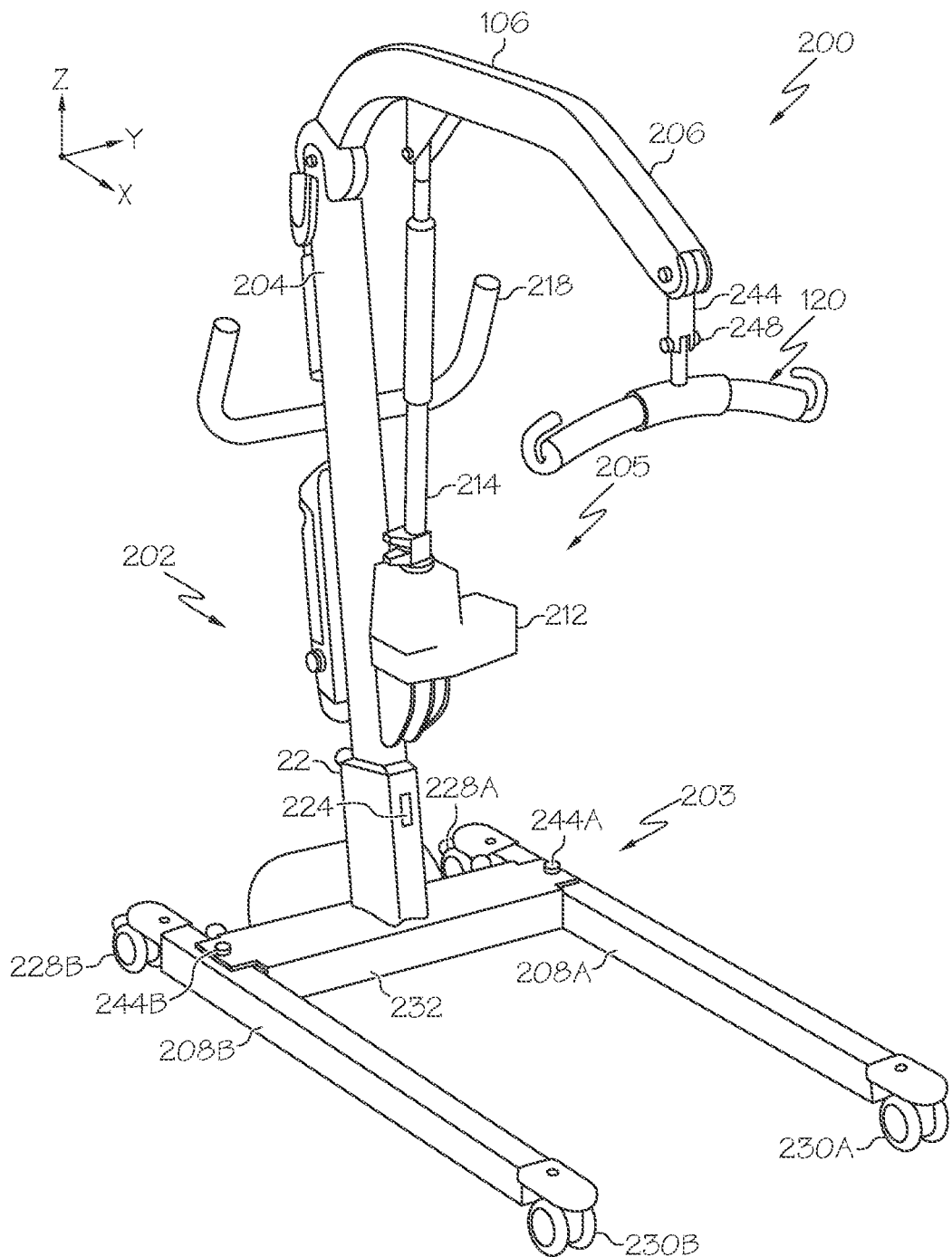
FIG. 5 is a side schematic view of a lift system according to one or more embodiments shown or described herein.

Referring now to FIG. 5, the accelerometer 164 may also detect movement of the sling bar 120. Detection of movement of the sling bar 120 may be used to transition the electronic control unit 140 and other electronic components of the sling bar 120 between a low power consumption mode when the accelerometer 164 detects no movement of the sling bar and a full function mode when the accelerometer 164 detects movement of the sling bar. When in a low power consumption mode, the electronic control unit 140 may consume minimal power from the battery 149, thereby extending the time between charges of the sling bar 120. When maintained in the low power consumption mode, the electronic control unit 140 may selectively not direct power to certain electronic components, thereby reducing the electrical current drawn from the battery 149. Upon the accelerometer 164 detecting movement of the sling bar 120, the electronic control unit 140 may then direct power to other electronic elements of the sling bar 120, thereby providing electrical current to power all of the functional elements of the sling bar 120.

In one embodiment, the plurality of coupling sensors 132 may be powered off when the electronic control unit 140 determines that no movement of the sling bar 120 is occurring. When the electronic control unit 140 receives a signal from the accelerometer 164 that corresponds to the sling bar 120 having its orientation moved, the electronic control unit 140 may transition from the low power consumption mode to the full functional mode, including energizing the coupling sensors 132, which places them in a condition to sense whether the lifting accessory 150 is installed in proper manner relative to the sling bar 120.

In some embodiments, the sling bar 120 may include a predetermined threshold of movement below which the sling bar 120 is maintained in the low power consumption mode. For example, the sling bar 120 may be maintained in the low power consumption mode when the angular orientation of the sling bar 120 changes less than a predetermined amount over a predetermined amount of time, for example, less than 15 degrees over 3 seconds. Modifications in orientation larger than such predetermined amount or predetermined amount of time may correspond to intentional movement of the sling bar, which corresponds to a caregiver preparing to perform a lift procedure. In another example, the sling bar 120 may be maintained in the low power consumption mode until the angular orientation of the sling bar 120 changes less than, for example, 90 degrees. By including such predetermined thresholds of movement before transitioning from the low power consumption mode, inadvertent movement of the sling bar 120 may not result in increased power consumption from the battery 149.

In yet other embodiments, the sling bar 120 may be selected to transition from a low power consumption mode to a full functionality mode based on a change of position of the sling bar 120 within a caregiving environment. The sling bar 120 may determine that its position has changed within a caregiving environment, for example, based on data provided by the wireless communication device 80. In such embodiments, the modification of position of the sling bar 120 may indicate that a caregiver is preparing to use the sling bar 120 in a lift procedure, and the sling bar 120 may transition to the fully functional mode of its power state.

In some embodiments, a caregiver may manually modify the power status of the sling bar 120 may pressing a button on the sling bar 120 to transition the sling bar 120 from the low power consumption mode to the full functional mode.

Referring again to FIG. 2, in embodiments, the electronic control unit 140 may also be programmed to provide a warning signal with the display 146 and/or the audible indicator 147 to a caregiver operating the person lift system 100 based on the status of the battery 149 that powers the person lift system 100. For example, the electronic control unit 140 may illuminate portions of the display 146 as green (or maintain the illumination as green) to indicate that the battery 149 is fully charged or, alternatively may illuminate a portion of the display 146 as green and flash a portion of the display 146 to indicate that the battery 149 is charging. Alternatively, the electronic control unit 140 may illuminate a portion of the display 146 as red to indicate that the battery 149 needs to be charged. In this embodiment, the electronic control unit 140 may also communicate with the lift unit 102 to lock-out the lift unit 102 from performing a lift procedure when the battery 149 needs to be charged to prevent the person lift system 100 from being used until the sling bar 120 has sufficient charge in its battery 149 to be fully functional.

Maintaining the sling bar 120 in the low power consumption mode may increase the time between charges that are need to maintain appropriate charge level for the battery 149. Increasing the time between charges may result in increased usage of the components of the sling bar 120 that evaluate appropriateness of the installation of the lifting accessory 150 on the attachment points 124. Increased time between charges may allow for better compatibility of the sling bar 120 with lift units that do not include elements for charging of the sling bar 120. To deploy sling bars 120 according to the present disclosure into caregiving environments with legacy lift units, longer times between charging may be desired.

Referring again to FIG. 4A, in some embodiments, the sling bar 120 may include a wireless communication device 80, for example, a Bluetooth, Wi-Fi, or other NFC (near field communication) module that is coupled to the electronic control unit 140 of the sling bar 120. The wireless communication device 80 connects wirelessly to other electronic devices to create a communication link between the sling bar 120 and a wireless receiver within the caregiving environment. In one example, the wireless communication device 80 includes a Wi-Fi module that connects to a wireless local area network. The sling bar 120 may communicate with other devices that are in communication on the local area network. Data, for example, data corresponding to power status of the sling bar 120, the change state of the battery 149, the previous weights lifted by the sling bar 120, and whether the lifting accessories 150 were installed correctly when a person was lifted by the sling bar 120 may be communicated to, for example, a centralized server that monitors the function of the sling bar 120 in the caregiving environment. Additionally, local networks can be used for asset tracking of the sling bar 120 to determine its last or present location within a facility.

In some embodiments, the sling bar 120 may also include a data capture device 82, for example a barcode reader 84. The data capture device 82 may capture data associated with the caregiving environment and/or the person. In some embodiments, that captured data is stored in the sling bar 120 for later processing. In other embodiments, that captured data is transmitted back to the centralized server 70. In some embodiments, the centralized server 70 can determine if the selected components of the person lift system 100, for example, the lift unit 102 and the sling bar 120, are appropriate for the lift procedure.

Referring collectively to FIGS. 2 and 4A, in some embodiments, the caregiver may use the data capture device 82 to scan a bar code that is associated with a particular person. In other embodiments, the caregiver may use the data capture device 82 to scan a bar code that is associated with an environment in which a person is present. When the data of the environment is transmitted back to the centralized server 70, the centralized server 70 may associate the environment with the particular person. The centralized server 70 may also evaluate the historic conditions of the person, for example, the historic weight of the person captured from previous lift procedures. Based on the historic conditions of the person and the selected components of the person lift system 100 that are targeted for use in the lift procedure, the centralized server 70 can determine if the selected components of the person lift system 100 are appropriate for the intended lift procedure. If the centralized server 70 determines that the selected components are not appropriate for the intended lift procedure, for example, that the weight of the person exceeds the weight limits of the components of the person lift system 100. If such conditions are determined, unacceptability of the equipment may be communicated to the caregiver, for example, by projecting an indication on the display 146 or causing an audible indication to be projected by the audible indicator 147.

Figure 4B:
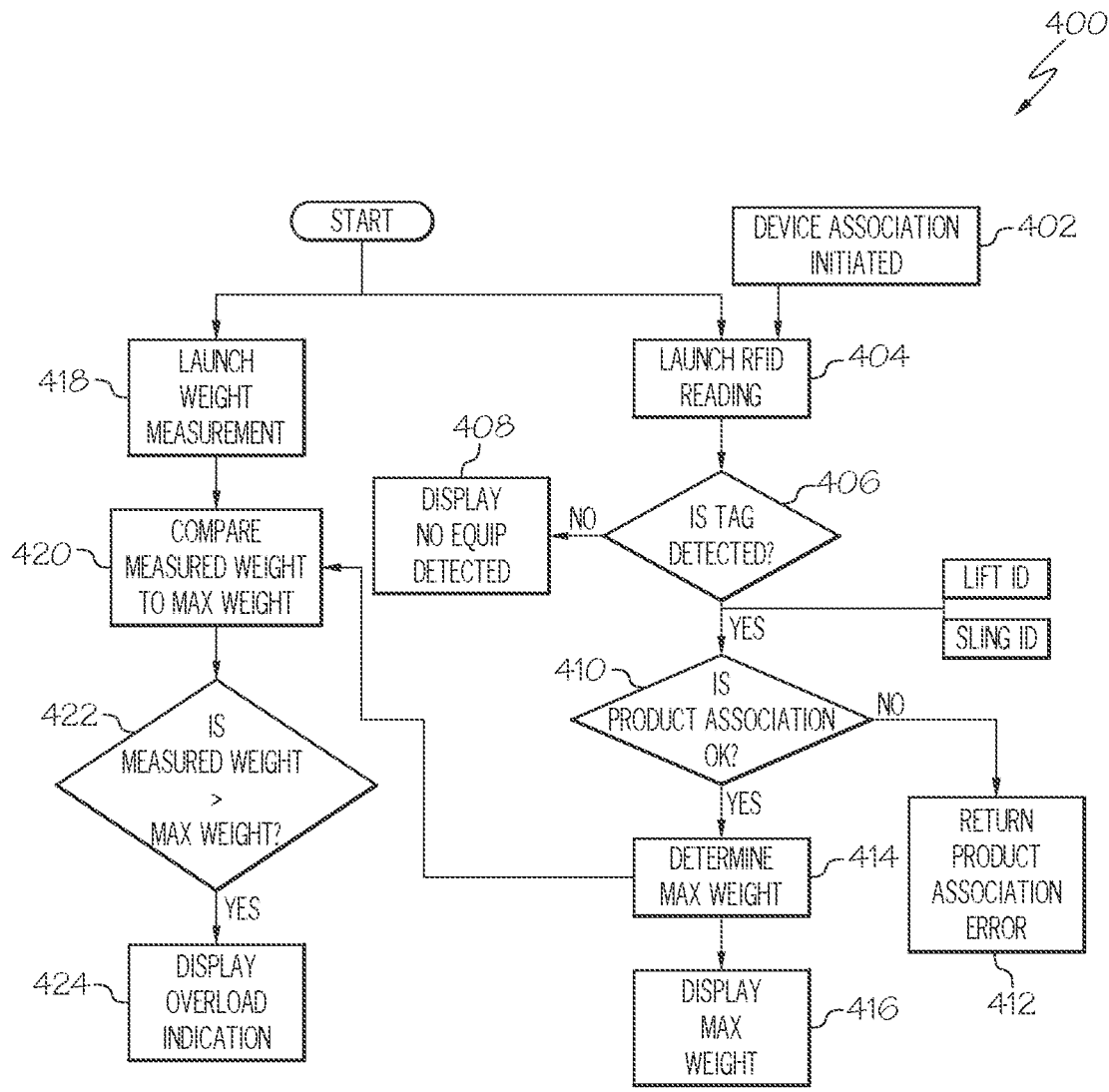
FIG. 4B is a flowchart of an example method for determining if the weight to be lifted by a sling bar is within a predetermined loading limit of the person lifting system according to one or more embodiments shown or described herein.

FIG. 4B is a flowchart of an example method 400 for determining if the weight of the person exceeds the weight limits of the components of the person lift system 100. In particular, at block 402, a device association process is initiated. The initiation can be, for example, in response to a caregiver pressing a device association button on the sling bar 120 or otherwise in communicative connection with the person lift system 100. Next, the coupling sensors 132 are activated, thereby launching an RFID reading at block 404. At block 406, the centralized server 70 determines if a tag has been detected. If the answer is no, at block 408, the centralized server 70 causes the display to indicate that no equipment has been detected. If, however, the centralized server 70 determines that a tag, such as a lift ID tag or a sling ID tag has been detected at block 406, the centralized server 70 determines whether the product association is acceptable at block 410. Although the process described in method 400 is described as including an RFID reading of tags, it is contemplated that in other embodiments, the product association can be determined based on the use of the data capture device 82 to scan the barcode of the sling and/or lift.

If the product association is not acceptable, such as because the lift or sling are not compatible with the sling bar 120 (or with one another), at block 412, the centralized server 70 causes a product association error to be returned. The error, for example, can be displayed on the display 146, projected as an audible indication by the audible indicator 147, or can be recorded in a memory of the centralized server 70.

If, however, the product association is acceptable (e.g., a "yes" at block 410), the centralized server 70 determines the maximum weight based on the components of the person lift system 100 that are targeted for use in the lift procedure at block 414. Such information can be, for example, stored in a look up table (LUT) in a database on the centralized server 70 and associated with each of the lift ID and sling ID detected. The overall maximum weight for the person lift system 100, in various embodiments, is the minimum value reported a maximum supported weight for each of the components of the person lift system 100. The centralized server 70 then displays the maximum weight on the display 146 at block 416.

The method also includes the launching of a weight measurement process at block 418. The weight measurement process, in some embodiments, includes activating the scale 160 and measuring the load applied to the load cell 162 to determine the weight of the person, while in other embodiments, the launching of a weight measurement process causes the person to be weighed using another weighing device coupled to the centralized server 70, such as a person support apparatus having weighing functionality. In still other embodiments, the weight measurement process may access the electronic medical records for the person and obtain a recent weight for the person to be used in method 400.

Regardless of how the weight of the person is obtained by the centralized server 70, at block 420, the centralized server 70 compares the measured weight to the maximum weight determined at block 414. At block 422, the centralized server 70 determines if the measured weight is greater than the maximum weight and, if the answer is yes, at block 424, the centralized server 70 causes an overload indication to be displayed on the display 146, indicating to the caregiver that the intended lift procedure is unacceptable.

Although method 400 is described as being performed by the centralized server 70, it is contemplated that some or all of the steps of the method 400 may be performed by the electronic control unit 140, or other computing devices communicatively coupled to the centralized server.

In some embodiments, the data capture device 82 may associate the components of the person lift system 100 and the lift procedure itself with a caregiver. Data captured by the sling bar 120 may be used to evaluate caregiver performance, for example, by capturing the quantity of lift procedures a caregiver conducts in which the lifting accessory 150 is assembled correctly relative to the sling bar 120. This data may be reviewed at regular intervals with the caregiver to determine if the person lift system 100 is being used correctly, and if the caregiver needs additional training to operate the person lift system 100 according to its proper operation.

Additionally, in some embodiments, the sling bar 120 includes functionality to keep track of the number of lifts that the sling bar 120 has performed. Also, other metrics can be stored by the sling bar 120 to ensure that the sling bar 120 is still within certain safety standards to perform lifts. These metrics can include, by way of example and not limitation, the age of the sling bar, the number of times the sling bar 120 has been washed, the number of times the sling bar 120 has been misused, or the like. The sling bar 120 may include internal safe guards which deactivate the sling bar 120 after a predetermined number of uses.

Figure 4C:
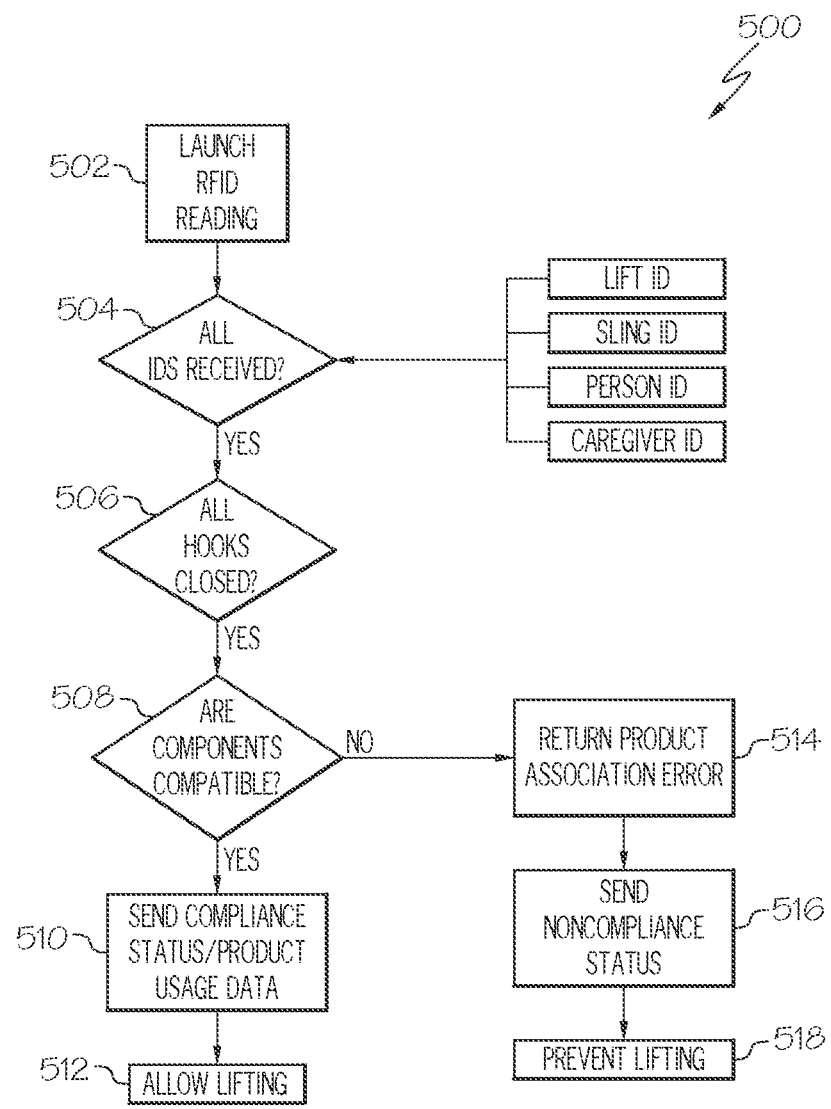
FIG. 4C is a flowchart of an example method for determining a compliance status of the person lifting system according to one or more embodiments shown or described herein.

FIG. 4C is a flow chart of an example method 500 that includes reporting a compliance status. In particular, at block 502, the coupling sensors 132 are activated, thereby launching an RFID reading. At block 504, the centralized server 70 determines if all IDs, including a lift ID, a sling ID, a person ID, and a caregiver ID, have been received. If the answer is no, the method pauses until all IDs are received. If, however, the answer is yes, the centralized server 70 determines if all hooks are closed at block 506. If the answer is no, the method pauses until the hooks are closed.

If, however, the answer at block 506 is yes, the centralized server 70 determines if the components are compatible at block 508. This can be done as described hereinabove. For example, the compatibility of various components can be stored in a LUT on a database coupled to the centralized server 70 to enable the centralized server 70 to determine if the components are compatible with one another.

If the components are compatible, at block 510, the centralized server 70 sends a compliance status and/or product usage data to the appropriate components, such as to the sling bar, a person's electronic medical record, or a caregiver's personnel record. Finally, the centralized server 70 may enable lifting, such as by restoring full functionality to the person lift system 100.

If, however, the components are not compatible at block 508, the centralized server 70 returns a product association error at block 514, and sends a non-compliance status at block 516. For example, a non-compliance status may be logged in the caregiver's personnel record, indicating that they attempted a non-compliant lift procedure. In addition, the centralized server 70 may prevent lifting at block 518, such as by reducing or eliminating power to the person lift system 100.

Although method 500 is described as being performed by the centralized server 70, it is contemplated that some or all of the steps of the method 500 may be performed by the electronic control unit 140, or other computing devices communicatively coupled to the centralized server.

While FIGS. 1 and 2 depict the lift unit 102 of the person lift system 100 as an overhead person lift, it should be understood that the person lift systems and methods for operating person lift systems described herein may be used in conjunction with other lift units having various other configurations including, without limitation, stationary person lift systems and mobile person lift systems. Further, it should also be understood that, while specific embodiments of the person lift system described herein relate to person lift systems used for raising and/or lowering persons, the identification and control systems described below may be used with any lift system that is operable to raise and lower a load.

In FIG. 5, a lift unit 202 includes a mobile lift having a base 203, a lift mast 204, and a lift arm 206. The base 203 may include a pair of base legs 208A, 208B, which are pivotally attached to a cross support 232 at base leg pivots 244A, 244B such that the base legs 208A, 208B may be pivotally adjusted with respect to the lift mast 204. The base legs 208A, 208B may additionally include a pair of front casters 230A, 230B and a pair of rear casters 228A, 228B. The rear casters 228A, 228B may include caster brakes (not shown).

In one embodiment, the base 203 may further include a mast support 222 positioned on the cross support 232. In one embodiment, the mast support 222 may be a rectangular receptacle configured to receive the lift mast 204 of the person lift system 200. For example, a first end of the lift mast 204 may be adjustably received in the mast support 222 and secured with a pin, threaded fastener, or a similar fastener coupled to the adjustment handle 224. The pin or threaded fastener extends through the mast support 222 and into a corresponding adjustment hole(s) (not shown) on the lift mast 204. Accordingly, it will be understood that the position of the lift mast 204 may be adjusted vertically (e.g., in the +/−Z direction on the coordinate axes shown) with respect to the base 203 by repositioning the lift mast 204 in the mast support 222. The lift mast 204 may further include at least one handle 218 coupled to the lift mast 204. The handle 218 may provide an operator with a grip for moving the person lift system 200 on the casters. Accordingly, it should be understood that, in the depicted embodiment, the person lift system 200 is mobile and may be repositioned throughout a caregiving environment.

The person lift system 200 may further include a lift arm 206 that is pivotally coupled to the lift mast 204 at the lift arm pivot 238 at a second end of the lift mast such that the lift arm 206 may be pivoted (e.g., raised and lowered) with respect to the base 203. The lift arm 206 may be selectively coupled to at least one sling bar 120, such that the sling bar 120 is raised or lowered with the lift arm 206. In the depicted embodiment, the sling bar 120 is coupled to the lift arm 206 with an accessory coupling 248. In one embodiment, the accessory coupling 248 is pivotally attached to the lift arm 206 at attachment pivot 244 such that the sling bar 120 may be pivoted with respect to the lift arm 206. However, it should be understood that, in other embodiments, the accessory coupling 248 may be fixedly attached to the lift arm 206 or that the sling bar 120 may be directly coupled to the lift arm 206 without the use of an accessory coupling 248.

While the embodiments described herein refer to the lift actuator 205 as comprising a motor 212 and an actuator arm 214, it will be understood that the actuator may have various other configurations and may include a hydraulic or pneumatic actuator comprising a mechanical pump or compressor, or a similar type of actuator. Further, in other embodiments, where the person lift system is a cable-based lift system, the actuator may be a motor which pays out and/or takes-up cable thereby raising and/or lowering an attached load. Accordingly, it will be understood that various other types of actuators may be used to facilitate raising and lowering the lift arm and/or an attached load with respect to the base 203.

Similar to the embodiments described hereinabove with respect to FIGS. 1-3, the sling bar 120 evaluate the installation of the lifting accessory 150 on the sling bar 120, and projects an indication to the caregiver when the lifting accessory 150 is installed correctly and projects an indication to the caregiver when the lifting accessory is installed incorrectly. Similarly, the sling bar 120 may calculate the weight of the person that is lifted in a lift procedure and may determine if the weight that is lifted exceeds is within a predetermined loading limit of the various components of the person lift system 200, including the sling bar 120, the lifting accessory 150, and the lift unit 202. The sling bar 120 may project an indication to the caregiver when the weight lifted by the person lift system 200 is within the predetermined loading limit and may project an indication to the caregiver when the weight lifted by the person lift system 200 exceeds a predetermined loading limit.

In various embodiments, the sling bar 120 may be in electronic communication with the lift unit 202, particularly the lift actuator 205. If conditions of operation of the person lift system 200 are outside of the designed limits, for example if the lifted weight exceeds the predetermined loading limit or if the lifting accessory is improperly installed relative to the sling bar 120, the sling bar 120 may interrupt operation of the lift actuator 205 and/or may place the lift actuator 205 in a reduced functionality mode.

Figure 6A:
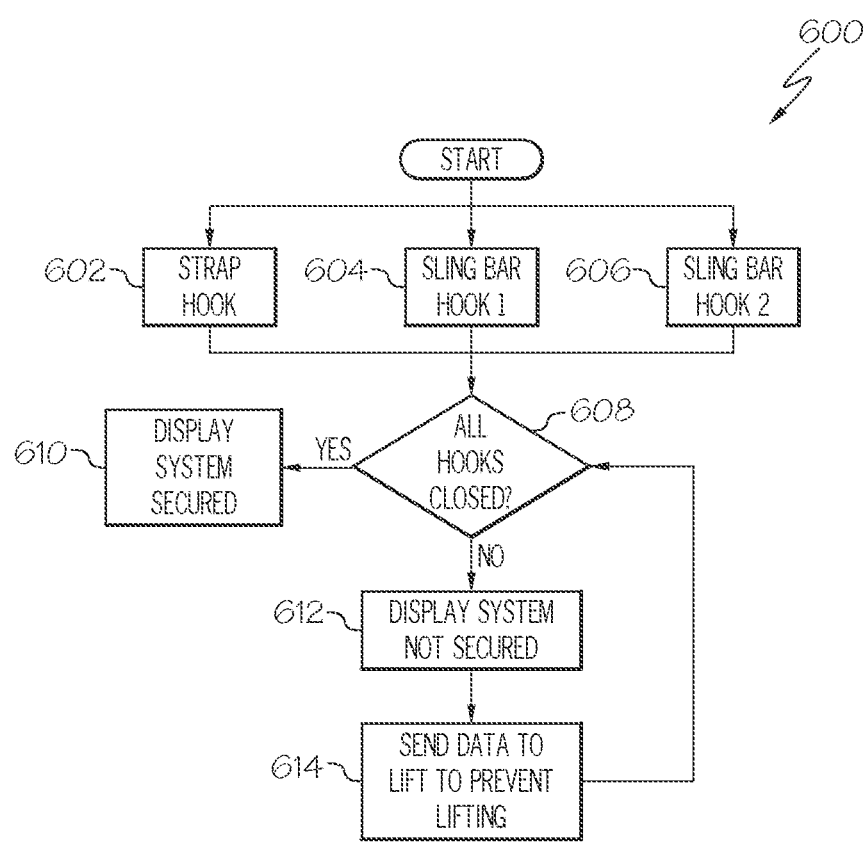
FIG. 6A is a flowchart of an example method for determining if a person lift system is secured according to one or more embodiments shown or described herein.

As described above, various embodiments enable the person lift system to determine whether the person lift system is secure for a lift procedure. FIG. 6A depicts an example method 600 for determining whether the person lift system is secure. In the embodiment in FIG. 6A, the method 600 begins when the strap hook 602, the first sling bar hook 604, and the second sling bar hook 606 are activated. For example, the electronic control unit 140 may receive information from the attachment points 124 of the sling bar 120 indicating that a lifting accessory 150 has been coupled to the sling bar 120, and that the sling bar 120 has been coupled to the lift unit 102 via the lift strap 112. More particularly, the sensor 116 can provide an indication to the electronic control unit 140 that the lift strap 112 is secured to the sling bar 120. At block 608, the electronic control unit 140 determines if all of the hooks are closed. For example, the switches 116 associated with the hooks can transmit information to the electronic control unit 140 regarding an open or closed status. When all hooks are closed, at block 610, the electronic control unit 140 can display a "system secured" status on the display device 146. However, if not all of the hooks are closed, at block 612, the electronic control unit 140 can display a "system not secured" status on the display device 146 and send data to the lift unit 102 to prevent lifting from occurring at block 614. For example, the electronic control unit 140 may selectively not direct power to the lift unit 102. The method 600 may then return to block 608 until the electronic control unit 140 determines that all of the hooks are closed and enables lifting to occur.

Figure 6B:
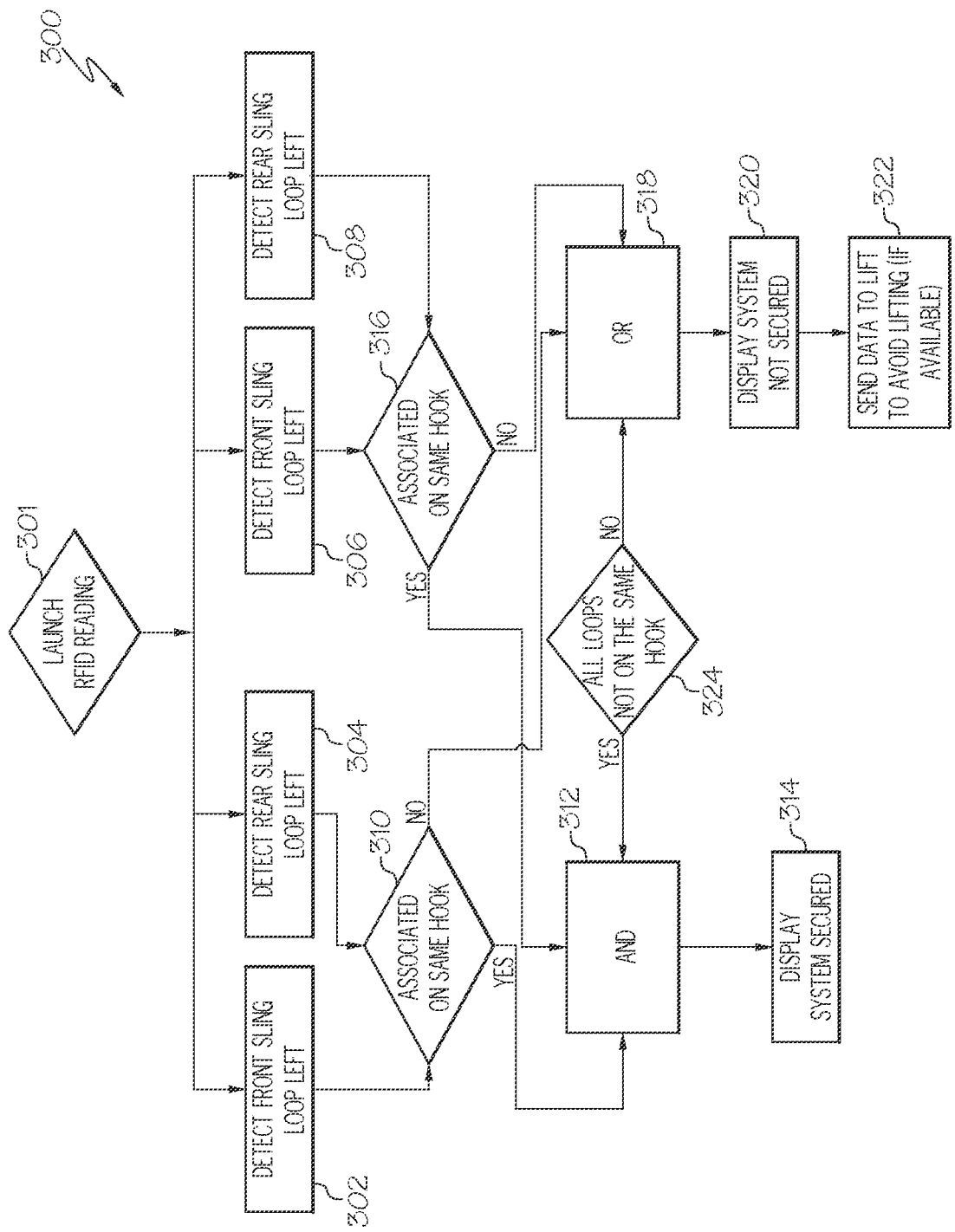
FIG. 6B is a flowchart of another example method for determining if a person lift system is secured according to one or more embodiments shown or described herein.

In another embodiment, a method 300 for determine whether the person lift system is secure for a lift procedure, as shown in FIG. 6B, is initiated when the electronic control unit 140 receives input from various sensors on the sling bar 120 to determine if the lifting points 154 are positioned in the correct attachment points 124.

At block 301, the coupling sensors 132 are activated, thereby launching an RFID reading. As described above, the coupling sensors 132 may be activated by opening the switch 126.

At blocks 302 and 304, the coupling sensor 132 detects the identification emitters 158 for a front and rear lifting point 154, respectively, on the left side of the lift sling 152. At blocks 306 and 308, the coupling sensor 132 detects the identification emitters 158 for a front and rear lifting point 154, respectively, on the right side of the lift sling 152. For example, as described above, the identification emitters 158 secured within the each of the lifting points 154 may be passive radio frequency identification device (RFID) tags, and the coupling sensor 132 may be an RFID transmitter and receiver configured to detect the each of the identification emitters 158.

At block 310, the electronic control unit 140 determines whether the correct identification emitters 158 are on the left attachment point 124 and at block 316 the coupling sensors determines whether the correct identification emitters 158 are on the right attachment point 124. At block 324, the electronic control unit 140 determines if all of the lifting points 154 are not on the same attachment point 124. If the answer is yes at blocks 310, 316, and 324, at block 312, the electronic control unit 140 confirms that blocks 310, 316, and 324 are all true values in the logic tree, allowing the sling bar 120 to perform a safe lift. At block 314, the electronic control unit 140 causes a confirmation to be displayed on the display 146 that a safe lift can be performed by a caregiver.

If, however, the answer at block 310 or block 316 is no (e.g., the electronic control unit 140 determined that at least one incorrect identification emitter was on one of the shackles), or the answer at block 324 is no (e.g., multiple loops are on the same hook), the logic proceeds to block 318, where the electronic control unit 140 confirms that at least one of blocks 310, 316, or 324 returns a null value. After confirming that at least one of the blocks returns a null value, at block 320, the electronic control unit 140 causes an error to be displayed on the display 146 that a safe lift cannot be performed by a caregiver, and at block 322 data is sent from the electronic control unit 140 to the lift unit 102 to prevent a lift from occurring. For example, the electronic control unit 140 may selectively not direct power to the lift unit 102.

Figure 7:
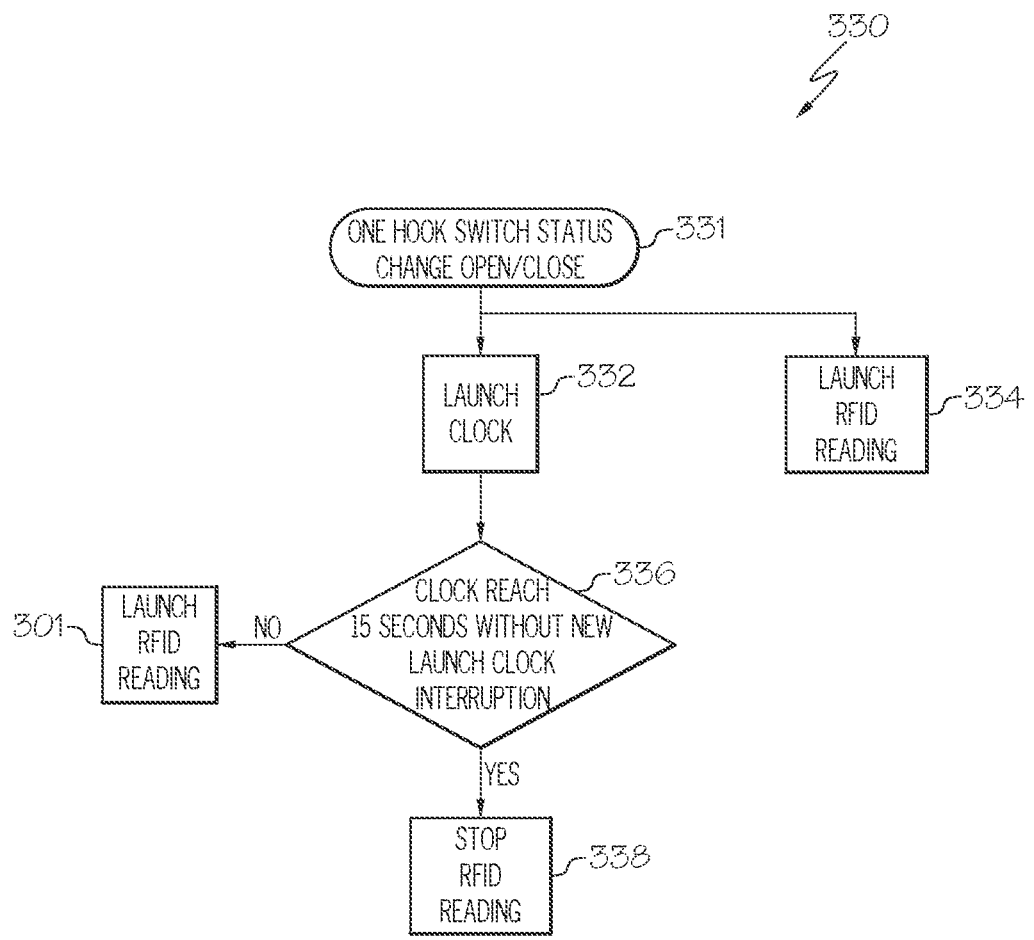
FIG. 7 is a flowchart of an example method for determining if a sling bar can be placed in a low power consumption mode according to one or more embodiments shown or described herein.

As described above, the sling bar 120 includes a low power consumption mode to avoid draining the battery 149 while the sling bar 120 is not in use. However, the sling bar 120 must be able to be activated when a lift is being prepared, or the sling bar 120 must be able to return to a low power consumption mode when a lift has been completed. In either case, a method 330, depicted in FIG. 7, is used to determine if the sling bar 120 can be placed in a low power consumption mode.

At block 331, in the electronic control unit 140 determines that a status of at least one switch 126 has changed, for example from closed to open. At block 332, the electronic control unit 140 activates an internal clock for a prescribed time interval, such as 15 seconds.

At block 334, the electronic control unit 140 activates the coupling sensors 132 to detect the identification emitter 158. At block 336, the electronic control unit 140 determines if either of the coupling sensors 132 has detected an identification emitter 158, or if the time interval of block 332 has completed. If, at block 336, the electronic control unit 140 determines that the clock reached the predetermined time interval without a new launch, the electronic control unit 140 deactivates the coupling sensors 132 at block 338. If, however, at block 336, the electronic control unit 140 determines that a coupling sensor 132 has detected an identification emitter 158 before the predetermined time interval expired, the logic proceeds to block 301 and begins the process of determining if the identification emitter 158 is in the proper location, as shown in FIG. 6B.

Based on the foregoing, it should be understood that person lift systems according to the present disclosure include sling bars having a plurality of attachment points that each have coupling sensors that detect the presence of lifting points of a lifting accessory. The sling bar includes an electronic control unit that evaluates the order and orientation of installation of the lifting points to determine if the lifting accessory is properly installed on the sling bar. The sling bar projects an indication to a caregiver when the lifting accessory is installed correctly or incorrectly relative to the attachment points of the sling bar. The electronic control unit further operates the sling bar in a low power consumption mode or in a full function mode when the electronic control unit senses that the sling bar is set to be used in a lift procedure. Operating the sling bar in a low power consumption mode when the sling bar is not being used in a lift procedure may increase the time between charges of a battery powering the sling bar.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A person lift system, comprising:
   a lift unit;
   a sling bar that is coupled to the lift unit, the sling bar comprising a plurality of attachment points each having coupling sensors and an electronic control unit that is communicatively coupled to the coupling sensors, at least one attachment point of the sling bar comprising a latching hook and a switch arranged on the at least one attachment point, the switch detecting a closed state of the latching hook; and
   a lifting accessory comprising a plurality of lifting points that are adapted to be selectively coupled to the plurality of attachment points of the sling bar,
   wherein the electronic control unit comprises a processor and a computer readable and executable instruction set which, when executed by the processor:
      detects with the coupling sensors whether the lifting accessory is installed in a proper manner; and
      projects an indication when the lifting accessory is installed in the proper manner.

2. The person lift system of claim 1, wherein the lifting accessory comprises a plurality of identification emitters, wherein each of the plurality of identification emitters is positioned proximate to a corresponding one of the plurality of lifting points.

3. The person lift system of claim 2, wherein the coupling sensors of the sling bar comprise emitter detectors that detect whether the plurality of identification emitters of the lifting accessory are properly positioned relative to the plurality of attachment points of the sling bar.

4. The person lift system of claim 3, wherein the electronic control unit of the sling bar is communicatively coupled to the lift unit, and the computer readable and executable instruction set, when executed by the processor: prevents operation of the lift unit when no identification emitter is detected by any coupling sensor;
   interrupts operation of the lift unit when less than all of the identification emitters is detected by the coupling sensors or if any one of the identification emitters is positioned incorrectly relative to the coupling sensors; and
   allows operation of the lift unit when all of the identification emitters of the lifting accessory are positioned correctly relative to the coupling sensors.

5. The person lift system of claim 1, wherein the computer readable and executable instruction set, when executed by the processor:
   operates the electronic control unit in a low power consumption mode when the switch arranged on the at least one attachment point changes from a closed or open state and no lifting accessory is detected by the coupling sensors; and
   operates the electronic control unit in a full function mode when the switch arranged on the at least one attachment point changes from a closed or open state and the lifting accessory is detected by the coupling sensors.

6. The person lift system of claim 1, wherein the sling bar further comprises an accelerometer that is communicatively coupled to the electronic control unit.

7. The person lift system of claim 1, wherein the sling bar further comprises a wireless data module that is in communication with the electronic control unit.

8. The person lift system of claim 1, wherein the sling bar further comprises an identification emitter.

9. The person lift system of claim 8, wherein the lift unit comprises an identification emitter and the sling bar comprises an identification detector that detects the identification emitter of the lift unit.

10. The person lift system of claim 1, wherein the sling bar further comprises:
    a scale that is in electronic communication with the electronic control unit and that is positioned to detect weight that is applied to all of the attachment points of the sling bar through the lifting accessory.

11. The person lift system of claim 10, wherein the computer readable and executable instruction set, when executed by the processor:
    calculates a weight applied to the sling bar through the lifting accessory;
    determines if the weight applied to the sling bar is within predetermined loading limits of the lift unit, the sling bar, and the lifting accessory.

12. A person lift system, comprising:
    a lift unit; and
    a sling bar that is coupled to the lift unit, the sling bar comprising an activation sensor and an electronic control unit that is communicatively coupled to the activation sensor;
    wherein the electronic control unit comprises a processor and a computer readable and executable instruction set which, when executed by the processor:
       operates the electronic control unit in a low power consumption mode when the activation sensor is not triggered; and
       operates the electronic control unit in a full function mode when the activation sensor is triggered.

13. The person lift system of claim 12, wherein the activation sensor comprises a coupling sensor and a switch, the activation sensor activating by changing the state of the switch from closed or open, activating the coupling sensor, and the coupling sensor detecting an identification emitter.

14. The person lift system of claim 12, wherein the activation sensor is an accelerometer that is triggered by movement of the sling bar.

15. The person lift system of claim 12, wherein the sling bar further comprises a power source in electronic communication with the electronic control unit.

16. The person lift system of claim 15, further comprising a charging interface in electronic communication with the power source.

17. The person lift system of claim 16, wherein the charging interface comprises a plurality of terminals that are positioned along an outside surface of the sling bar.

18. The person lift system of claim 16, wherein the charging interface comprises an inductive charging coil.

19. The person lift system of claim 18, wherein the lift unit further comprises an inductive charging base coil that is inductively coupled to the charging coil.

\* \* \* \* \*